April 16, 1968  A. M. JONES ETAL  3,378,607
PRODUCTION OF SOLID COPOLYMERS
Filed Dec. 19, 1963

INVENTORS.
ALVA M. JONES,
JEROME A. PLANCHARD, JR.,
BY RAYMOND A. SPEED,

ATTORNEY.

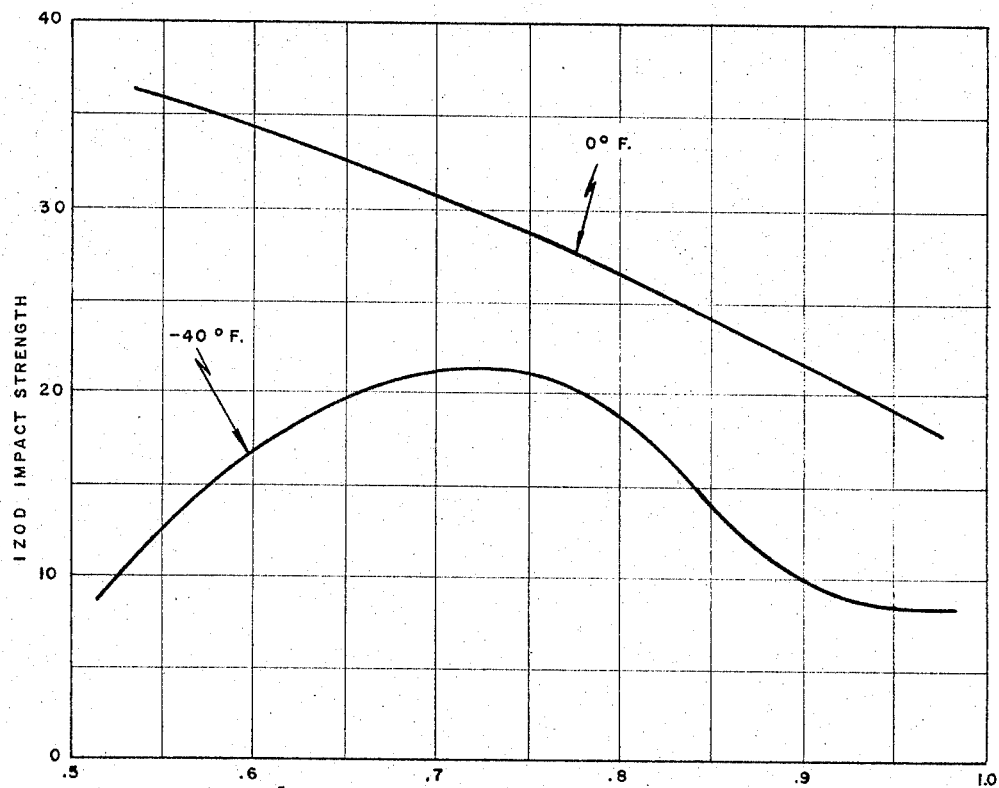
FIG. 3. RATIO; $C_3^=$ CONVERSION IN 1ST. REACTOR / $C_3^=$ TOTAL CONVERSION
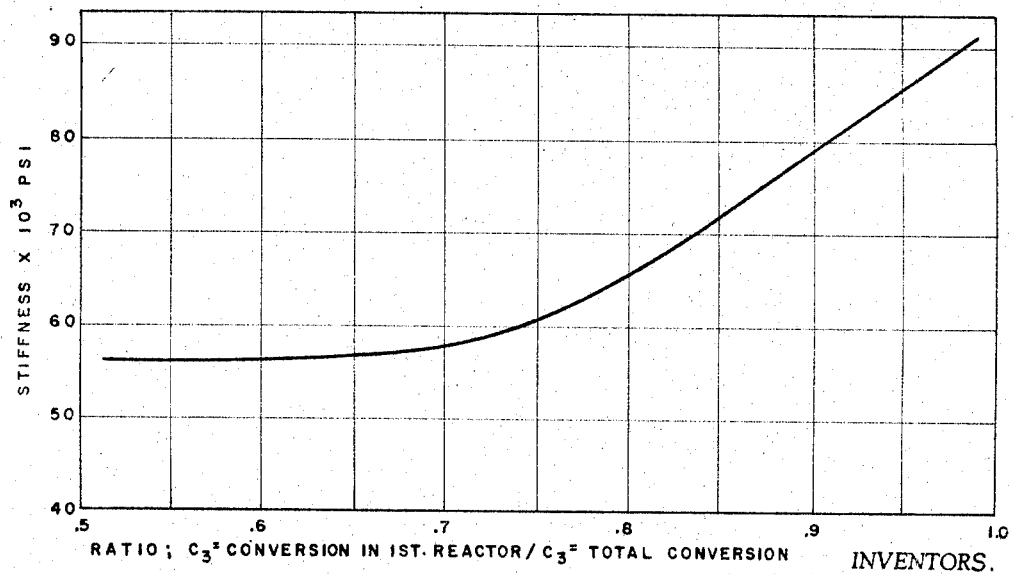
RATIO; $C_3^=$ CONVERSION IN 1ST. REACTOR / $C_3^=$ TOTAL CONVERSION
FIG. 4.
INVENTORS.
ALVA M. JONES,
JEROME A. PLANCHARD, JR.
BY RAYMOND A. SPEED,
ATTORNEY.

April 16, 1968    A. M. JONES ET AL    3,378,607
PRODUCTION OF SOLID COPOLYMERS
Filed Dec. 19, 1963    3 Sheets-Sheet 3

ETHYLENE BAND OF INFRARED ABSORBTION SPECTRUM

INVENTORS.
ALVA M. JONES,
JEROME A. PLANCHARD, JR.,
BY RAYMOND A. SPEED,

*Sylvester Th. Brock Jr.*
ATTORNEY.

3,378,607
PRODUCTION OF SOLID COPOLYMERS
Alva M. Jones, Jerome A. Planchard, Jr., and Raymond A. Speed, Baytown, Tex., assignors, by mesne assignments, to Esso Research and Engineering Company, Elizabeth, N.J., a corporation of Delaware
Filed Dec. 19, 1963, Ser. No. 331,749
4 Claims. (Cl. 260—878)

ABSTRACT OF THE DISCLOSURE

An ethylene-propylene block copolymer which has good flexural stiffness, good tensile strength, and minimizes the loss of its impact strength when cooled over the temperature range of 0° F. to −40° F. may be produced in a two-stage polymerization reaction process using a titanium halide-triethyl aluminum catalyst in both stages, wherein the conditions are correlated so as to consume in the first stage from 78% to 85% of the total reacted propylene and the remaining portion of the total reacted propylene during the second stage of the polymerization process, and wherein the conditions within the second stage are correlated so as to obtain a final product containing from 6 to 10 weight percent combined ethylene.

---

One of the most useful of the polyolefins currently in commercial production is homopolypropylene. However, one of the principal drawbacks to that polymer is its property of low-temperature brittleness, that is, a loss in impact strength at low temperatures. The polypropylene industry has modified the polymer by introducing elastomers such as polyisobutylene into the base polypropylene resin. While this results in a marked reduction in low-temperature brittleness, other physical properties of the polymer suffer in this combination of materials. In particular, in order to obtain good low-temperature strength, sufficient polyisobutylene must be used so that the melt index is greatly lowered. This reduces flowability and the molding properties of the polyolefins suffer as a result. A loss in color of the final mixture is also a major drawback to this expedient of forming a polymer blend.

Also, the necessity of utilizing a separate step of mixing the polyisobutylene with the polypropylene resin adds to the cost of processing, both from the standpoint of capital investment as well as operating costs. Therefore, the market has sought a plastic which can be produced without blending but which can be blended with polypropylene if desired, and which retains good impact strength at low temperatures while retaining sufficient flexural stiffness to be used as a molding-grade polymer. It is desirable that when blended with polypropylene, the polymer properties are changed linearly so as to obtain a full range of impact grades in order to suit market demand, without suffering debits in the flowability and molding characteristics or ultimate color of the polymer.

The polymer produced by the present invention solves all of these problems. Further, unlike the current block propylene-ethylene copolymers which are available on the market, the copolymer of the present invention does not lose its low-impact strength at temperatures as low as −40° F. It is this loss of low-temperature impact strength which limits the low-temperature utilization of block copolymers currently available on the market.

The polymer product of the present invention is thought to be a physical mixture of polypropylene and a block copolymer formed of propylene and ethylene. The polymer product retains a great deal of its impact strength at low temperatures and at the same time maintains other physical properties (such as tensile strength and stiffness) within desirable ranges.

It has also been found that the block copolymer of the present invention exhibits a linear blending characteristic when combined with homopolypropylene. Thus, an entire range of impact grades can be made from a single high impact grade of copolymer by blending it with varying amounts of polypropylene. All of this can be understood by reference to the discussion of the process which follows below, and by reference to the appended drawings wherein:

FIG. 3 is a graphical illustration of the Izod impact strength at 0° F. and −40° F. compared with the percent conversion of propylene in the first stage;

FIG. 4 is a graphical illustration of the flexural stiffness compared with the amount of total propylene conversion accomplished in the first stage;

Figure 1:
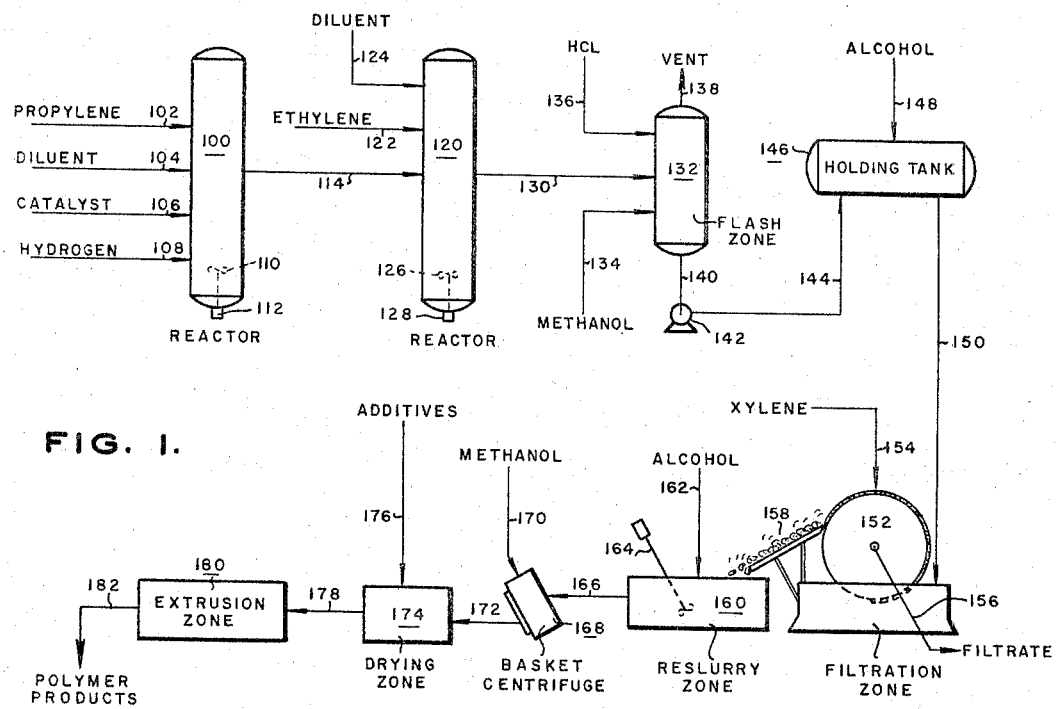
FIG. 1 is a schematic flow sheet depicting the production of the polymer of the present invention.

Turning now to the process, it has been found that the block copolymer having the desirable characteristics of both aspects of the present invention is produced in a two-stage polymerization reaction, wherein polypropylene is reacted in the first stage to produce a mixture of homopolypropylene and living polypropylene chains which are then charged, along with a certain amount of unconverted propylene, into the second-stage reactor, wherein ethylene is engrafted upon the living polypropylene chains. It has been found by the present invention that desirable copolymers are produced when a titanium halidetriethyl aluminum catalyst is used and the conditions in the two reaction zones are so correlated as to consume from 68% to 93% of the total reacted propylene in the first reactor, with the final polymer product containing from 6 to 10 weight percent ethylene. This contradicts the prior art teachings that propylene conversion in the second stage should be minimized and that a maximum of only about 4% ethylene (by weight) should appear in the final product. Note that there are two expressions of propylene reaction: (1) percent reacted based on the propylene feed admitted into a given reactor, and (2) percent of consumed propylene, which is based on total propylene in the final polymer.

Considering the process, in the first-stage reactor, a hydorocarbon diluent is charged along with the propylene and polymerization catalyst so as to act as a heat sink for the exothermic reaction. Hydrogen also is introduced in order to control the molecular weight of the polypropylene which is produced in the first reactor.

The hydrocarbon diluent may be chosen from the group consisting of aromatic hydrocarbons, such as benzene, naphthalene, etc.; alkyl-substituted aromatic hydrocarbons, such as toluene, xylenes, mesitylenes, etc.; paraffins, such as n-heptane, n-pentane, etc.; and isoparaffins, such as isooctane, etc.

The propylene is charged into the first reaction zone in amounts from about 5 to 50 pounds of propylene per hundred pounds of hydrocarbon diluent, and in order to control molecular weight of the polypropylene produced in the first reactor, from 0 to 1000 p.p.m. of hydrogen are introduced into the first reaction zone, based on the propylene feed. In certain instances, for example in producing blow-mold grade polymer, the addition of hydrogen is not necessary.

The catalyst system used in the process of the present invention is preferably a cocrystallized titanium trichloride-aluminum chloride catalyst modified with triethyl aluminum. The titanium trichloride is cocrystallized with aluminum chloride in the ratio of 3:1, and is modified with from about 50 mol percent to about 700 mol percent triethyl aluminum, the mol percent being based upon the $TiCl_3 \cdot \frac{1}{3} AlCl_3$ cocrystallized catalyst.

Other Ziegler catalysts may be used in the present invention, including titanium trichloride and other halides of the transition metals. These catalysts are modified with triethyl aluminum as set out above. A diethyl aluminum chloride promoted $TiCl_3 \cdot \frac{1}{3} AlCl_3$ catalyst has been used, but does not exhibit the peak in the impact retention curve (FIG. 2) as is obtained with the triethyl aluminum-promoted catalyst.

The conditions within the first reaction zone may include a temperature within the range of 145° F. to 175° F., a pressure from 60 to 150 p.s.i.g., and a residence time from 60 minutes to 360 minutes. These conditions are correlated in order to obtain a net propylene conversion in the first reactor of from about 50 to about 96 percent (based on propylene charged) in order to obtain a polypropylene product containing some living polypropylene chains and to leave sufficient unreacted propylene in the reactor effluent to form the basis for consuming from 7% to 32% of the total reacted propylene in the second-stage reactor (68% to 93% being consumed in the first reactor). Alternatively, of course, additional polypropylene could be introduced into the second reactor from the propylene source.

In the second reactor, it is preferred to charge the entire effluent from the first reactor. In addition from 0 to 200 pounds of additional diluent per hundred pounds of diluent initially charged into the first reactor may be added in order to lower the temperature within the second reactor, and to control the dilution of the reactants therein. From 0.5 to 7.5 pounds of ethylene per hundred pounds of total diluent charged into the second reactor are also introduced, and this ethylene reacts with the living polypropylene chains in the first-reactor effluent to form the second portion of the block copolymer chain. From 4 to 50 pounds of propylene are charged and/or carried over from the first reactor per hundred pounds of propylene charged to the first reactor. A certain amount of unreacted propylene is also consumed during this step, so as to introduce a certain amount of randomness into the second portion of the block copolymer. The temperature in the second reaction zone may range from 105° F. to 180° F., at a pressure of 60 to 150 p.s.i.g., and a residence time from 5 minutes to 240 minutes.

It is reiterated that the conditions in the first and second-stage reactors are chosen so as to consume from about 68% to 93% of the reacted propylene in the first-stage reactor and to produce a polymer product containing from 6 to 11 weight percent combined ethylene.

It is to be noted that the polymer product of the present invention is thought to comprise a mixture of homopolypropylene which is formed in the first reactor and is passed as dead chains into the second reaction zone, along with the block copolymer produced in the second reaction zone and a small amount of random copolymer which is also produced from the ethylene and propylene in the second reaction zone which, although polymerized, are not attached to the polypropylene chain.

Referring now to FIG. 1 wherein is disclosed a preferred mode of the present invention, a first-stage reaction zone 100 is provided for the reaction of propylene in preparing living chains whereupon will be reacted the ethylene and some propylene in the second-stage zone. Propylene is introduced into the first-stage reactor 100 by way of line 102, along with a diluent such as xylene which is introduced by way of line 104. The catalyst for the reaction, comprising $TiCl_3 \cdot \frac{1}{3} AlCl_3$ and triethyl aluminum, may be introduced separately or together through the catalyst line 106. A xylene carrier stream for the catalyst is preferably employed. Hydrogen is introduced into zone 100 by way of line 108. Within the zone 100 the stereospecific exothermic reaction is carried out with the propylene in solution in the diluent, the temperature ranging from 145° F. to 175° F., preferably 165° F., and the pressure being sufficient to maintain the propylene in solution in the diluent. From 60 to 150 p.s.i.g. pressure is suitable. The reaction zone 100 is also provided with heat exchange means for carrying away the heat of reaction. The reactants are maintained in intimate contact by means of the mixer 110 driven by motor 112.

After a residence time of 60 to 360 minutes, the total effluent from the first reaction zone is withdrawn by way of line 114. The total effluent will comprise an admixture of homopolypropylene which has become "dead" by severance from active catalyst sites, homopolypropylene which remains "living" (attached to active catalyst sites), unreacted propylene, hydrogen, and catalyst.

The total effluent from the first reaction zone is preferably charged into second reaction zone 120 along with ethylene charged by way of line 122 and, if desired, additional diluent by way of line 124. Within the zone 120 the ethylene and unreacted propylene are added onto the polypropylene chains which remain active catalyst sites, so as to form the block copolymer. Within the reaction zone 120, then, the properties of the homopolypropylene are undergoing change. Some random ethylene-propylene copolymer will also be formed. The reactants within the zone 120 are maintained in intimate admixture by way of mixer 126, driven by motor 128.

The temperature within the second reaction zone 120 is maintained within the range of about 105° F. to about 180° F., and a pressure of 60 to 150 p.s.i.g. The pressure is suitably slightly less than that in the first reaction zone so as to allow free flow of the first zone effluent into the second reaction zone. About 60 p.s.i.g. is a required minimum in the first section to prevent flashing of the propylene monomer.

The total effluent from the second zone 120 is removed by way of line 130 and charged into a flash zone 132. Into the flash zone 132 are charged methanol (or any $C_1$ to $C_5$ alcohol) by way of line 134 and hydrogen chloride by way of line 136, whereby the catalyst in the polymer product is solubilized in the methanol, as is known in the art. Unreacted propylene, ethylene, and hydrogen are vented from the flash zone by way of line 138. The liquid product, comprising the polymer and catalyst in solution in the diluent, is removed from the flash zone by way of line 140 and passed by pump 142 and line 144 into a holding zone 146, wherein the polymer solution is contacted with a $C_1$ to $C_5$ alcohol (such as methanol) admitted by way of line 148 in order to control the polymer rejection. The flashing and holding zones may be combined if desired. From the holding zone 146, the polymer as a slurry is passed by way of line 150 into a rotary filtration zone 152, in which it is washed by an application of diluent-alcohol mixture introduced by line 154. The wash liquid may contain from 0% to 50% alcohol. The filtrate is removed by way of line 156.

Solid polymer from the rotary filtration zone is passed by way of means 158 which may suitably be a trough or a belt conveyor into a reslurry zone 160, wherein the polymer is reslurried with a $C_1$ to $C_5$ alcohol (such as methanol) added by line 162, and agitated by means 164. The reslurried polymer is passed by way of line 166 into a basket centrifuge zone 168 wherein it is washed by another application of alcohol (such as methanol) by way of line 170. From the basket centrifuge zone the washed polymer is passed by way of line 172 into a drying zone 174, combined with additives introduced by means 176, and dried. The dried polymer (containing additives such as oxidation stabilizers) is then discharged by way of line 178 and extruded in the extrusion zone 180, from whence is recovered the polymer product by way of line 182.

Thus, it is seen that a method of producing the novel polymer of the present invention is provided which is generally similar to that process which is used in producing polypropylene. The physical facilities which are utilized in producing a polypropylene may, with the provision of a second reactor and other slight changes, be used in the production of the novel copolymer of the present invention.

Returning now to the properties of the block copolymer of the present invention, it is to be noted that in contradiction to the teachings of the prior art that a block copolymer should be produced by first polymerizing the propylene and then polymerizing the ethylene comonomer onto the living polypropylene chains in the substantial absence of unreacted propylene, the present invention utilizes a certain amount of unreacted propylene in the second stage so that both ethylene and propylene are being added to the polypropylene living chains.

Figure 2:
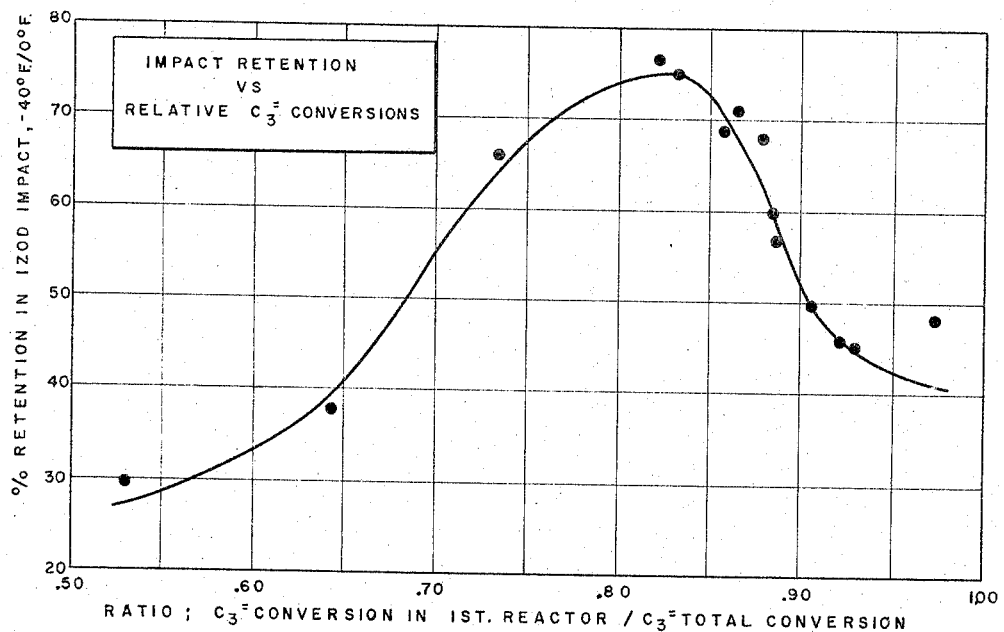
FIG. 2 is an illustration of the impact retention in the polymer product as compared to the percent of total propylene conversion which is accomplished in the first reactor.

Referring now to FIG. 2, the impact retention of the polymer product at lower temperatures is shown as a function of the portion of total reacted propylene which is consumed in the first stage. Since the polymer product has a wide range of melt indices, the impact retention has been chosen as the ratio of the Izod impact strength at −40° F. as compared to the Izod impact strength at 0° F. Thus, the effect of the melt index is minimized in order to assess the value of the propylene reacted in the second stage. By reference to FIG. 2, it is seen that when between about 68% and 93% of reacted propylene is consumed in the first stage, the impact retention is greater than 50%, with a maximum impact retention occurring between about 78% and 86% propylene converted in the first reactor. Runs 5 and 8, while falling within the area of optimum percent propylene which is converted in the first reactor, appear not to follow the general line of retention of the Izod impact strength. However, Run 5 contains only 5.4 weight percent ethylene in the product and Run 8 carried out over 93% of the propylene conversion in the first reactor. Thus, it is shown that two conditions must be satisfied; that is, the precent of reacted propylene which is consumed in the first reactor must fall within the range of 68% to 93%, preferably 78% to 85%, and the ethylene content must be at least 6 weight percent and preferably not more than 11 weight percent.

Referring now to FIG. 3 (from whence FIG. 2 was derived), it is seen that the low-temperature Izod strength (−40° F.) appears to reach a maximum at between 70% and 75% propylene converted in the first reactor. It is also seen that the 0° F. Izod strength declines virtually linearly with increase in propylene conversion in the first-stage reactor. The data plotted in FIG. 3, however, includes products of widely differing melt indices, so that for optimum low-temperature impact at a given melt index, the ranges shown to be an optimum in FIG. 2 would, of course, control.

FIG. 4 illustrates the increase in flexural stiffness with the increase in propylene converted in the first reactor. It is to be noted that within the preferred range of 68% to 93%, the slope of the curve changes from essentially horizontal to almost 45°. Thus, the impact retention of the polymer is combined with an optimization of the flexural stiffness in order to obtain a highly satisfactory product.

Figure 5:
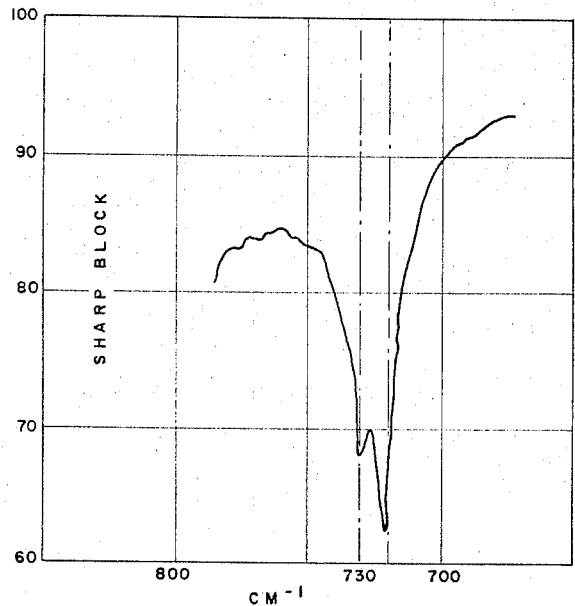
FIG. 5 is an illustration of the infrared absorption spectrum in the 720 to 730 cm.$^{-1}$ range of the polymer product of the present invention.

Referring to FIG. 5, an infrared examination of a typical polymer produced by the present invention shows that at the 720 and 730 cm.$^{-1}$ bands, absorption peaks are observed. It has been found that the polymer of the present invention has a ratio of absorbence at 720/730 cm.$^{-1}$ within the range of 1.1 to 1.8. This ratio is indicative of the "sharpness of the block," lower ratios indicating the formation of a random copolymer.

Figure 6:
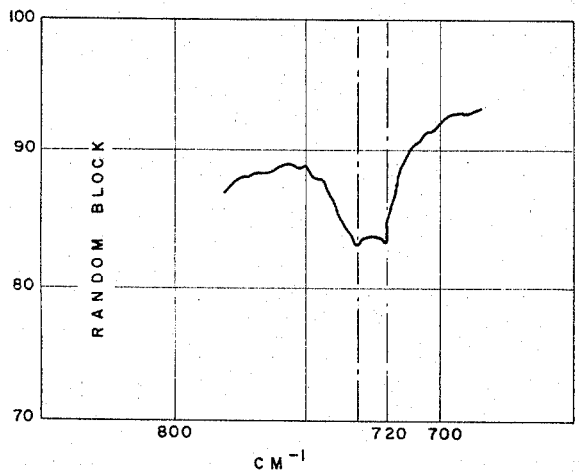
FIG. 6 is an illustration of the infrared spectrum in the 720 to 730 cm.$^{-1}$ range of a block copolymer not produced according to the present invention.

FIG. 6 illustrates the infrared spectrum in the 720 to 730 cm.$^{-1}$ range of a block copolymer which is not produced according to the present invention, and which represents a typical block copolymer available on the market today. A comparison of FIGS. 5 and 6 shows the marked difference in infrared absorption at 720 and 730 cm.$^{-1}$.

In establishing the variables from whence the graphical illustrations were drawn, a number of runs were made while using $TiCl_3 \cdot \frac{1}{3} AlCl_3$ catalyst promoted with triethyl aluminum. These data are shown below in Table I.

TABLE I.—TRIETHYL ALUMINUM MODIFIED CATALYST

| Run No | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1st Reactor: | | | | | | | | | | | | | | | | |
| Pressure, p.s.i.g | 75 | 75 | 75 | 75 | 75 | 75 | 75 | 75 | 75 | 75 | 75 | 75 | 75 | 75 | 75 | 75 |
| Temperature, °F | 159 | 158 | 159 | 160 | 150 | 150 | 150 | 151 | 151 | 151 | 150 | 149 | 149 | 149 | 150 | 149 |
| Xylene, #/hr | 96.8 | 96.1 | 98.7 | 96.9 | 97.9 | 98.4 | 48.5 | 48.2 | 49.5 | 36.7 | 88.0 | 46.3 | 47.8 | 48.1 | 47.0 | 35.3 |
| Propylene, #/100 # Xylene | 5.50 | 5.48 | 5.39 | 5.44 | 5.44 | 11.1 | 9.0 | 10.7 | 9.0 | 5.7 | 11.2 | 10.9 | 10.8 | 6.9 | 6.7 | |
| Ti rate, #/100 # Xylene | .03 | .03 | .01 | .01 | .01 | .02 | .04 | .04 | .04 | .05 | .02 | .03 | .06 | .06 | .03 | .03 |
| Al/Ti Mol Ratio | 1.7 | 2.0 | 4.5 | 4.4 | 4.6 | 3.5 | 2.9 | 3.3 | 3.5 | 2.7 | 2.8 | 4.0 | 3.7 | 3.7 | 3.7 | 3.3 |
| Residence Time, Hrs | 1.0 | 1.0 | 1.0 | 1.0 | 1.0 | 1.0 | 1.9 | 2.0 | 2.0 | 2.6 | 1.1 | 2.0 | 2.0 | 2.0 | 2.0 | 2.8 |
| H₂ rate, p.p.m. on C₃⁼ charged | 37 | 37 | 36 | 37 | 37 | 36 | 36 | 45 | 37 | 59 | 38 | 37 | 37 | 37 | 60 | 55 |
| 2nd Reactor: | | | | | | | | | | | | | | | | |
| Temperature, °F | 112 | 104 | 104 | 133 | 140 | 142 | 142 | 138 | 141 | 142 | 152 | 119 | 122 | 148 | 126 | 126 |
| Additional Xylene, #/hr | | | | | | | | | | 28.7 | | | | | | |
| Total Xylene, #/hr | 96.8 | 96.1 | 98.7 | 96.9 | 97.9 | 98.4 | 48.5 | 48.2 | 78.2 | 36.7 | 88.0 | 46.3 | 47.8 | 48.1 | 47.0 | 35.3 |
| Ethylene, #/100 # Xylene | .48 | .48 | .47 | .49 | .49 | .47 | .97 | .96 | .60 | .90 | .52 | 1.00 | .97 | .96 | .50 | .44 |
| Residence Time, Hrs | .23 | .23 | .23 | .23 | .23 | .23 | .44 | .45 | .28 | .59 | .78 | 1.43 | 1.39 | 1.39 | 1.42 | 1.97 |
| Conversions: | | | | | | | | | | | | | | | | |
| Percent C₃⁼ in 1st Reactor | 68.9 | 65.2 | 39.4 | 47.5 | 38.4 | 60.0 | 79.7 | 85.5 | 75.1 | 72.3 | 44.9 | 85.3 | 87.4 | 94.9 | 77.5 | 75.9 |
| Percent C₃⁼, overall | 79.9 | 75.5 | 47.4 | 64.4 | 59.7 | 76.7 | 91.0 | 91.6 | 85.1 | 87.8 | 83.6 | 92.5 | 96.6 | 97.1 | 87.5 | 86.8 |
| Ratio C₃⁼ in 1st/C₃⁼ overall | 86.2 | 86.4 | 83.1 | 73.8 | 64.3 | 78.2 | 87.6 | 93.3 | 88.2 | 82.3 | 53.7 | 92.2 | 90.5 | 97.7 | 88.6 | 87.4 |
| Inspection Data: | | | | | | | | | | | | | | | | |
| Wt. Percent C₂⁼ in Product [1] | 6.8 | 8.5 | 9.0 | 7.3 | 5.4 | 6.4 | 7.5 | 7.9 | 7.6 | 10.3 | 7.0 | 7.2 | 8.9 | 7.9 | 10.3 | 10.6 |
| Mod Percent C₂⁼ in Product [2] | 6.8 | 9.0 | 9.3 | 6.5 | 4.1 | 4.9 | 6.4 | 5.7 | 8.5 | 10.9 | 5.6 | 7.2 | 8.0 | 7.5 | 10.5 | 11.5 |
| Melt Index at 230° C | 6.4 | 5.0 | 4.3 | 4.1 | 1.8 | 3.5 | 2.4 | 2.8 | 3.0 | 2.2 | 4.5 | 3.0 | 3.4 | 4.0 | 4.9 | 3.0 |
| Izod at 0° F. (Ft.-lb./in. un-notched) | 15.4 | 15.0 | 18.3 | 19.9 | 21.9 | 18.1 | 20.1 | 19.5 | 17.8 | 27.0 | 37.1 | 24.9 | 19.8 | 18.9 | 24.6 | 26.8 |
| Izod at −20° F. (Ft.-lb./in. un-notched) | 12.8 | 13.5 | 14.8 | 15.4 | 11.7 | 9.9 | 15.4 | 13.2 | 18.6 | 22.8 | 16.0 | 19.9 | 13.1 | 11.7 | 19.7 | 25.4 |
| Izod at −40° F. (Ft.-lb./in. un-notched) | 10.6 | 11.3 | 13.8 | 13.2 | 8.6 | 7.8 | 11.3 | 8.7 | 12.7 | 20.6 | 10.9 | 11.3 | 9.7 | 8.9 | 14.6 | 18.8 |
| 0° F./−40° F. retention, Percent | 68.8 | 75.3 | 75.4 | 66.3 | 39.3 | 43.1 | 56.2 | 44.6 | 71.3 | 76.3 | 29.4 | 45.4 | 49.0 | 47.2 | 59.3 | 70.2 |
| Flexural Stiffness, p.s.i | 95M | 100M | 94M | 80M | 78M | 81M | 75M | 84M | 87M | 93M | 61M | 78M | 80M | 89M | 83M | 81M |
| Tensile at yield, p.s.i | 3,533 | 3,667 | 3,336 | 3,367 | 3,318 | 3,350 | 3,192 | 3,320 | 3,444 | 3,001 | 2,849 | 3,017 | 3,483 | 3,796 | 3,266 | 3,167 |
| Elongation at yield, percent | 9.5 | 8.5 | 10.0 | 9.8 | 11.3 | 12.0 | 12.3 | 12.0 | 11.4 | 9.4 | 14.0 | 25.0 | 23.0 | 22.0 | 21.0 | 20.5 |

[1] Based on material balance correlation. [2] By infrared analysis.

By reference to Table I, and comparing Runs 3, 4, 11, 14, and 15, all of which have approximately the same melt index, it is seen that in Runs 3, 4, and 15, made in accordance with the present invention (incorporating greater than 6 weight percent ethylene in the final product while reacting greater than 68% but less than 93% of the total consumed propylene in the first reactor), an acceptable product was made wherein the Izod retention was greater than 50%, and the Izod strength at −40° F.

was greater than 13 ft.-lb./in. Contrarily, in Run 11, wherein 53.7 of the consumed propylene was reacted in the first reactor, an Izod retention of only 29.4% was obtained. Likewise, in Run 14 where 97.7% of the propylene consumed had been reacted in the first reactor, even though 7.5 mol percent (7.9 weight percent) ethylene was incorporated in the final product, only 47.2% Izod retention was accomplished and a —40° F. Izod strength of only 8.9 ft.-lb./in. was obtained.

Likewise, comparing Runs 5, 7, 8, and 10, all of which have approximately the same melt index, it is seen that Runs 7 and 10, which are in accordance with the present invention, produce Izod strengths at —40° F. of 11.3 and 20.6 ft.-lb./in., respectively, at Izod retentions of 56.2% and 76.3%. In Run 5, where the percent propylene reacted in the first reactor is 64.3, but only 4.1 mol percent (5.4 weight percent) ethylene is incorporated in the final product, the Izod retention is only 39.3% with a —40° F. Izod strength of 8.6 ft.-lb./in. Likewise, at the other end of the scale, Run 8 was made at 93.3% conversion with 5.7 mol percent (7.9 weight percent) ethylene in the final product. The —40° F. Izod of only 8.7 was realized at an Izod retention of only 44.6%.

Thus, it is seen that in order to obtain the optimum Izod impact retention, when using an aluminum triethyl promoted $TiCl_3 \cdot \frac{1}{3} AlCl_3$ catalyst, the two requisites must be met: (1) greater than 6 weight percent ethylene must be incorporated in the final product, and (2) of the propylene consumed, from 68% to 93% must be reacted in the first-stage reactor.

Having disclosed the present invention in detail, what is desired to be covered by Letters Patent should be limited not by the specific examples herein given, but rather by the appended claims.

We claim:

1. A method of preparing a block copolymer of propylene and ethylene which comprises charging into a first reactor
   a hydrocarbon diluent chosen from the group consisting of aromatic hydrocarbons, alkyl-substituted aromatic hydrocarbons, paraffins, and isoparaffins,
   from 5 to 50 pounds of propylene per 100 pounds of diluent,
   from 0.01 to 0.15 pound of catalyst per 100 pounds of diluent,
   said catalyst comprising $TiCl_3 \cdot \frac{1}{3} AlCl_3$ modified with from 50 to 700 mol percent triethyl aluminum, based on the $TiCl_3 \cdot \frac{1}{3} AlCl_3$ catalyst,
   and from 0 to 150 pounds of hydrogen per million pounds of propylene feed,
   polymerizing said propylene in said first reactor under conditions including,
   a temperature within the range of 145° F. to 175° F.,
   a pressure from about 60 to about 150 p.s.i.g., and
   a residence time from 60 minutes to 360 minutes,
   said conditions being correlated to obtain a net propylene conversion in said first reactor of from 50% to 96% based on monomer charged, and to obtain a first reactor total effluent which includes a polypropylene product containing living polypropylene chains and from 4 to 50 pounds of unreacted propylene per 100 pounds of propylene charged to the first reactor,
   charging the total effluent from said first reactor into a second reactor along with
   from 0 to 200 pounds of additional diluent per 100 pounds of diluent charged into the first reactor,
   and from 0.5 to 7.5 pounds of ethylene per 100 pounds of total diluent charged into the second reactor,
   polymerizing said ethylene, said living polypropylene, and unreacted propylene in said second reactor under conditions including
   a temperature within the range of 105° F. to 180° F.,
   a pressure from 60 to 150 p.s.i.g.,
   and a residence time from 5 minutes to 240 minutes,
   conditions in said first and second reactors being correlated so as to consume in the first reactor from 78% to 85% of the total propylene reacted in both reactors, and conditions in said second reactor being correlated so as to react from 7.4 to 100% of the propylene and from 2.3 to 100% of the ethylene charged to said second reactor to produce a copolymer product containing from about 6 to about 10 weight percent ethylene.

2. A method in accordance with claim 1 wherein the diluent is xylene.

3. A method of preparing a block copolymer of propylene and ethylene which comprises charging into a first reactor
   an inert hydrocarbon diluent,
   from 5 to 50 pounds of propylene per 100 pounds of diluent,
   from 0.01 to 0.15 pound of a triethyl aluminum modified Ziegler-type catalyst per 100 pounds of diluent,
   and from 0 to 150 pounds of hydrogen per million pounds of propylene feed,
   polymerizing said propylene in said first reactor under conditions including
   a temperature within the range of 145° F. to 175° F.,
   a pressure from 60 to 100 p.s.i.g., and
   a residence time from 90 minutes to 240 minutes,
   said conditions being correlated to obtain a net propylene conversion in said first reactor of from 50% to 96%, and to obtain a first reactor total effluent which includes a polypropylene product containing living polypropylene chains and from 4 to 50 pounds of unreacted propylene per 100 pounds of propylene charged to the first reactor,
   charging the total effluent from said first reactor into a second reactor along with
   from 0 to 200 pounds of additional diluent per 100 pounds of diluent charged into the first reactor, and
   from 0.5 to 7.5 pounds of ethylene per 100 pounds of total diluent charged into the second reactor,
   polymerizing said ethylene, said living polypropylene, and unreacted propylene in said second reactor under conditions including
   a temperature within the range of 105° F. to 180° F.,
   a pressure from 60 to 150 p.s.i.g., and
   a residence time from 5 minutes to 240 minutes,
   the conditions in said first and second reactors being correlated so as to consume in the first reactor from 78% to 85% of the total propylene reacted in both reactors, and conditions in said second reactor being correlated so as to react from 7.4 to 100% of the propylene and from 2.3 to 100% of the ethylene charged to said zone to produce a copolymer product containing from about 6 to about 10 weight percent ethylene.

4. A method of preparing a block copolymer of propylene and ethylene which comprises charging into a first reactor
   an inert hydrocarbon diluent,
   from 5 to 50 pounds of propylene per 100 pounds of diluent,
   from 0.01 to 0.15 pound of a triethyl aluminum modified Ziegler-type catalyst per 100 pounds of diluent,
   polymerizing said propylene in said first reactor under conditions including
   a temperature within the range of 145° F. to 175° F.,
   a pressure from 60 to 100 p.s.i.g., and
   a residence time from 90 minutes to 240 minutes,
   said conditions being correlated to obtain a net propylene conversion in said first reactor of from 50% to 96%, and to obtain a first reactor total effluent which includes a polypropylene product containing living polypropylene chains and from 4 to 50 pounds of unreacted propylene per 100 pounds of propylene charged to the first reactor, charging the total effluent from said first reactor into a second reactor along with from 0 to 200 pounds of additional diluent per 100 pounds of diluent charged into the first reactor, and from 0.5 to 7.5 pounds of ethylene per 100 pounds of total diluent charged into the second reactor, polymerizing said ethylene, said living polypropylene, and unreacted propylene in said second reactor under conditions including a temperature within the range of 105° F. to 180° F., a pressure from 60 to 150 p.s.i.g., and a residence time from 5 minutes to 240 minutes, the conditions in said first and second reactors being correlated so as to consume in the first reactor from 78% to 85% of the total propylene reacted in both reactors, and conditions in said second reactor being correlated so as to react from 7.4 to 100% of the propylene and from 2.3 to 100% of the ethylene charged to said zone to produce a copolymer product containing from about 6 to about 10 weight percent ethylene.

References Cited

UNITED STATES PATENTS 3,301,921   1/1967   Short _____ 260—878

FOREIGN PATENTS 601,560   2/1960   Italy.
1,258,741   3/1961   France.

MURRAY TILLMAN, *Primary Examiner.*

S. H. BLECH, *Examiner.*

D. J. BREZNER, M. J. TULLY, *Assistant Examiners.*